United States Patent Office 2,874,836
Patented Feb. 24, 1959

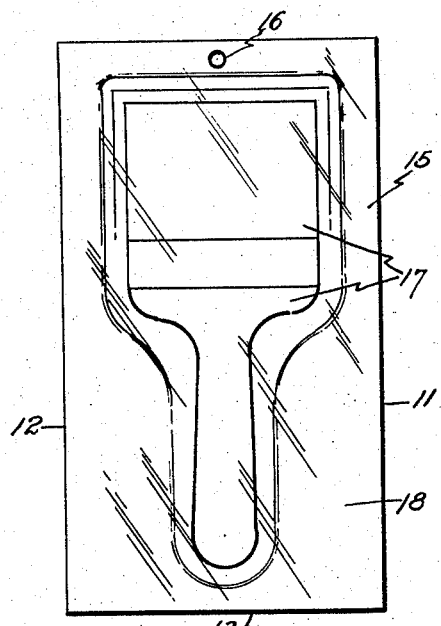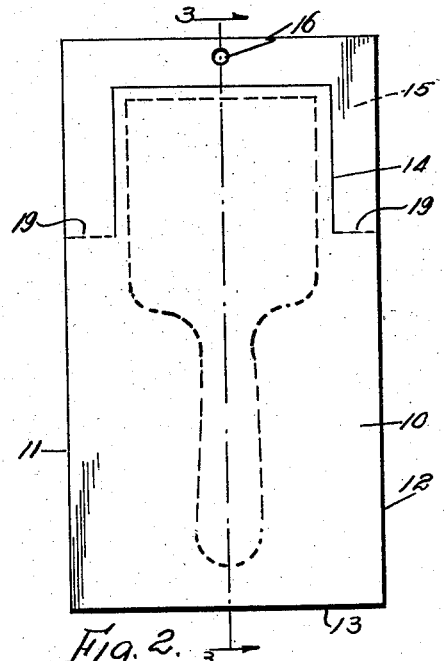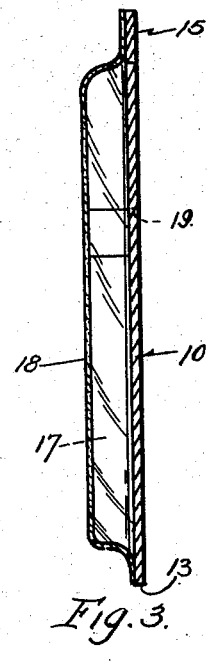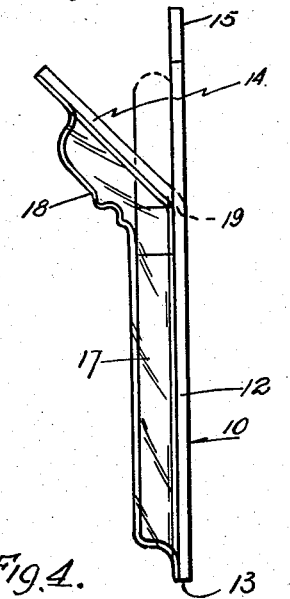

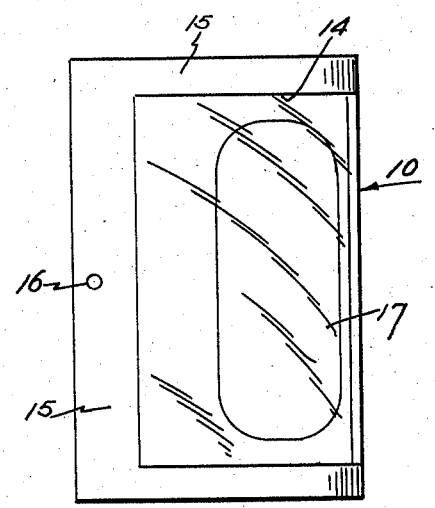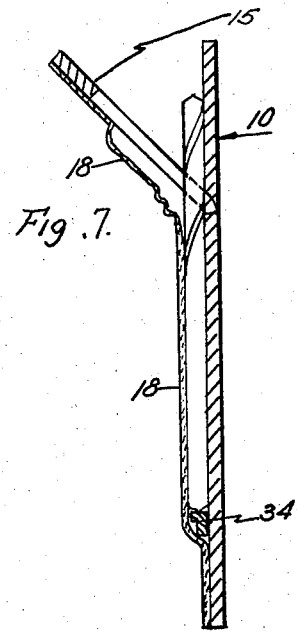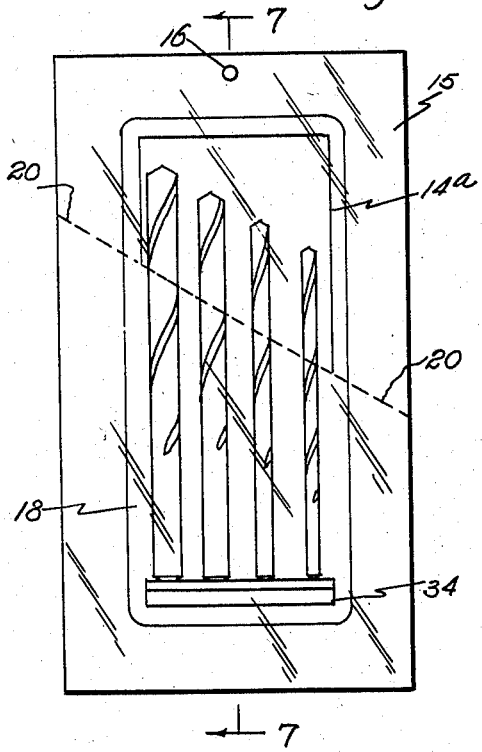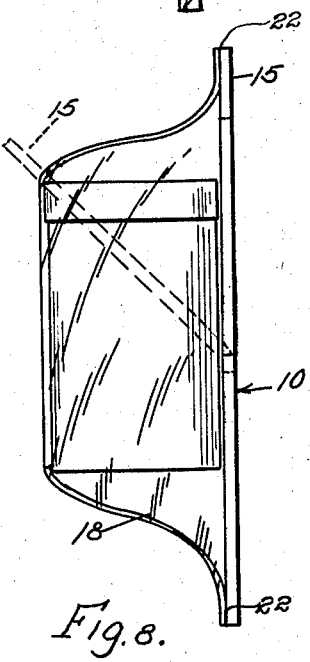

2,874,836

SEALABLE RE-USABLE SKIN PACKED PACKAGES FOR MERCHANDISE ARTICLES AND METHOD OF FORMING SAME

Alexander W. Wertepny, Jr., Des Plaines, Ill.

Application March 11, 1957, Serial No. 645,061

1 Claim. (Cl. 206—78)

My invention is directed to sealable, reusable skin-packed packages for merchandise articles of the general type utilizing transparent plastic sheet-like covering suitably secured to normally rigid backing or carriers or sheet-like panels.

Presently known skin-packed packages for merchandise have a number of objections and disadvantages among which are the following. The articles of merchandise or goods are placed upon a sheet-like backing of suitable material, which may be either plastic or equivalent thereof, or in a concave-like receptacle made of plastic, and thereafter a sheet of pre-heated plastic such as vinyl, to one face of the plastic sheet a suitable plasticizer or cement has been applied, is positioned over the plurality of spaced apart articles on such sheet. The plastic sheet is pressed by suitable mechanical or vacuum means at spaced apart points against the base or carrier member to heat-seal the pre-heated plastic sheet around the outer areas of the carrier member and around the respective articles, after which the individual spaced apart mounted and enclosed articles have to be cut apart.

Due to the projections and varying dimensions of the articles, it is impossible to normally cut apart the respective carrier members into sectors and individual units which carry their respective articles on commercial known paper cutters and the cutting apart operation in such cases involves substantial hand labor and time and consequent expense.

Another disadvantage is that in presently known heat-sealing practice, after the plastic sheet has been positioned over a plurality of spaced apart articles and the heat applied to specific areas of the sheet along with pressure on such areas, the plasticizer or cement being heated produces condensation and moisture within the package which remains there a substantial time and which moisture frequently is damaging to the merchandise and often causes discoloration and marks thereon.

Another disadvantage in presently known heat-sealed packages of the aforesaid presently known type is that access is prevented to the merchandise while it is on display and in stores, and customers and prospective customers cannot remove the merchandise articles for inspection and test, which is very important in the case of hardware items, tools, special devices, etc. which customers want to handle and test before purchase.

Another disadvantage is that in presently known heat-sealed packages having a partially transparent enclosing medium, such transparent plastic or the like has to be broken or ripped off from its backing to permit removal of any article of merchandise, with the result that such package cannot be re-used either by the customer or any-one else. Further, if a plurality of small articles are placed together in one heat-sealed enclosure, the breaking of the transparent wall of such enclosure makes it practically necessary to remove all of the plurality of articles therefrom at one time and makes the package unusable thereafter for retention of a part of such articles.

A further objectionable feature encountered in presently known skin-packaging in connection with certain types of merchandise articles is that such articles become marked and unsightly as a result of the chemical reaction which is caused by vapor and the application of heat on the plasticizer or cement on the transparent sheet, which chemical reaction is caused by the application of the heat necessary to effect the seal.

It is, therefore, among the objects of my invention (a) to provide a sealable skin-packed package for various and numerous merchandise articles which is reusable and which can be easily partially opened to permit access to the article of merchandise and optional removal and replacement thereof by persons; (b) to provide a reusable skin-packed package for numerous merchandise articles of various and irregular shapes which includes a suitable semi-rigid backing or carrier member composed of flexible material to which a transparent plastic shield or cover is heat-sealed to provide a compartment or pocket of the right size, and which formation into one or more pockets upon the carrier member may be made well in advance of the insertion or mounting of the merchandise articles, so that such containers with such openable pockets may be manufactured in advance and be easily and economically cut into sizes and shapes as desired on conventional shearing machines or the like and which can be at the same time substantially flattened without damaging the transparent plastic portion of the packages, and into which the respective articles of merchandise may be later inserted either at the same or another location or plant.

Where goods or merchandise are transported either within the same factory from one location to another or from one factory to another, or merchandise purchased in bulk is repacked into smaller containers for resale in different locations, this necessitates moving and transport of the merchandise and the packages to one place, and with utilization of my invention, it is an important advantage to have the heat-sealed openable packages prepared in large numbers in advance optionally at remote factories and into which the respective produced articles may be quickly and easily manually inserted at other locations.

It is, accordingly, a further important object and accomplishment of my invention to provide a sealable heat-sealed reusable container or package for merchandise or various articles which includes the combination of a normally rigid though bendable and/or flexible backing or carrier member or panel to which there has been heat-sealed and suitably secured portions of sheet of plastic or other suitable sheet material so as to form a chamber, compartment or pocket between such carrier member and such plastic, such pocket to be of the desired shape and size to accommodate and retain the merchandise article and at the same time permit its insertion or removal thereof whenever desired, and in which the said carrier member has one or more slots formed therein providing for flexing, distortion, collapsing, and opening of said package at the points or areas of such slot to permit subsequent insertion or removal of the merchandise or articles. Said heat-sealed package, because of its ability to be manufactured in advance in large numbers, without a mounting of the actual merchandise or goods therein, provides for economical preliminary packing and transport of my packages in a substantially collapsed or flattened state, this providing for easy and economical transport of the pre-manufactured collapsible packages to the areas wherein the merchandise is subsequently inserted therein. The natural tendency of the said backing material to resume its original normal flat state will cause said package, when collapsed and when the article is inserted thereinto, to resume its normal shape to completely enclose the article and provide an attractive container and protective mounting for the article.

A further object of my invention is the provision of a novel method of manufacturing a substantial number of my packages at one time by first molding and forming a substantial number of spaced apart article-receiving cavities at one time in a large plastic sheet, and then positioning and heat sealing at the proper locations said cavity-containing plastic sheet to a normally rigid though bendable carrier sheet or backing, in which backing or carrier sheet a plurality of angular or curved slits have been made in locations to receive the respective articles, and then cutting apart the joined backing with its attached cavity-bearing plastic sheet, into individual sections to form individual packages each of which is openable at the areas of such slit for insertion of the merchandise articles.

Other and further important objects of my invention will be apparent from the following description and appended claim.

On the drawings:

Fig. 1 is a front elevation of one preferred form of my novel sealed package illustrating an enclosed brush as a typical article of merchandise.

Fig. 2 is an elevation looking at the rear or back side of said package.

Fig. 3 is a vertical cross section taken on line 3—3 of Fig. 2.

Fig. 4 is a vertical cross sectional view of my package showing the end portion bent and distorted to form a closable opening, and illustrating a brush as an article of merchandise therein.

Fig. 5 is a top plan view looking at the bent over end of the package and looking through the opening at the merchandise article.

Fig. 6 is a front elevation of another embodiment of my invention illustrating a plurality of thin slender articles such as drills mounted in spaced apart pockets on a single carrier panel and illustrating the diagonal path along which the upper portion of the carrier panel will be shown.

Fig. 7 is a vertical section view on line 7—7 of Fig. 6 and looking in the direction of the arrows.

Fig. 8 is a side elevation of another form of my said package illustrating a merchandise container sealed and enclosed therein and illustrating in dotted lines the bent over position of the slotted portion of the carrier panel.

Numeral 10 designates a fibre-board or cardboard or equivalent backing or carrier panel which is cut from sheet material which has such rigidity as to normally return to its original flat plane when bent. Such carrier panels may vary in size and shape and are of a size larger than the merchandise article to be mounted thereon, with ample margins beyond the article. Said carrier or mounting panel 10 has opposite marginal or side edges 11 and 12 and opposite end edges 13.

A substantially U-shaped slit 14 either angular or arcuate is die-cut in said carrier panel 10 with its ends terminating inward of the lateral edges 11 and 12 and leaving integral side strips 19 along the latter edges of the panel 10 which form part of the U-shaped bendable panel section 15. The size of the projectable portion defined by said slit 14 must be greater than the greatest width of the article to be mounted. The U-shaped end portion of the panel will accordingly be bendable out of the normal plane of the panel 10 to form a transversely extending opening.

Numeral 16 designates an optional hole or aperture which is die cut in the upper bendable edge portion.

The distance between the inner edges of the side strips 19 of panel section 15 is made greater than the maximum width of the article to be mounted on said carrier panel 10 and enclosed in the package.

Numeral 17 designates a typical article of merchandise which in the drawings is a paint brush with its bristles extending in a normally upward direction.

Numeral 18 designates a flexible plastic sheet, which is preferably though not necessarily transparent. Said plastic sheet 18 is originally flat and has a thin coating of a suitable heat-responsive plasticizer or cement on one face thereof. Said coated plastic sheet in flat form is first subjected to heat sufficient to render the plasticizer or adhesive coating slightly tacky. The carrier panel 10 is positioned on the flat work table of a vacuum molding machine, which machine is provided with vacuum producing devices which are adapted to draw air through selected apertures of the work table. The panel 10 while it is flat is over the positioned apertures of such work tables; then either the article of merchandise or the rigid pattern of such merchandise is positioned on said panel 10 so that its end portion lies between the said strips 19 of the upper panel section 15. Then the heated plastic strip having said coating is placed over the article of merchandise and over said panel, and the outer edge portions of said plastic sheet 18 are pressed against the outer edge portions of said carrier panel 10, preferably with the outside of a suitably electrical heating means, as said frame is pressed against the outer portion of said plastic sheet, the intermediate portions of said plastic sheet are flexed and bent due to the obstruction of the merchandise article and at the same time stretched to thereby form a compartment, chamber or pocket and at the same time the said pressure of the heated frame seals by heating the outer peripheral areas of said plastic sheet 18 beyond the edge portions of the merchandise article or of the rigid pattern which simulates the merchandise article. The result of the foregoing is a complete enclosure in a package of the merchandise article held by said stretched and secured plastic sheet against the outer areas of the carrier panel 10.

Said normally sealed package is openable to remove or replace either the merchandise article or the rigid pattern thereof by manual flexing or hinging of the upper panel sections in a direction common to the side on which said plastic pocket and compartment has been formed, in a manner such as illustrated in Figs. 4 and 7, and in dotted lines in Fig. 8.

Such flexing of said panel section 15 forms a transversely extending opening as illustrated in Figs. 4 and 7 which provides a means of conveniently removing or remounting the merchandise article in said package, and when such merchandise article is inserted at the area of packaging, the upper panel section 15 is allowed to flex back to its original position into the same plane with the remainder of said panel 10 to thereby completely enclose the merchandise article.

I have found it advantageous to use patterns which are of a size and shape substantially similar to the merchandise article, this during the manufacturing of said packages, and such patterns may be quickly and easily removed and reused in the course of manufacture of a large number of packages at the place of manufacture of said packages. I have also found it advantageous to use a single rigid pattern having a plurality of spaced apart fingers or projecting members, each of which projecting members are of a size and shape similar to a plurality of separate merchandise articles which are to be packed and sealed on one of said carrier panels.

In Figs. 6 and 7, I have illustrated as an example of such articles and drills of different lengths and sizes, mounted in spaced relation in four spaced apart elongated pockets, which are formed in the manner previously described by sealing the plastic sheet to the carrier panel 10 not only along its outer edges but also along paths between said separate elongated articles, so as to provide elongated pockets into which such slender articles may be quickly and easily inserted. In cases where several separate articles of different lengths are to be mounted on a carrier panel, such as illustrated in Fig. 6, the U-shaped slit 14a is formed with one leg thereof substantially longer than the other legs so that when the upper panel section 15 is flexed out of the plane of the panel 10 to provide the end opening, the bending of said upper panel section 15 will be along a diagonal path which substantially traverses the ends of the legs of said slit 14a, as indicated by the dotted lines 20 in Figure 6. The opened position of the package such as illustrated in Fig. 6, is illustrated in the edge view of Fig. 7, in the position the merchandise may be inserted in the respective spaced apart pockets or removed therefrom.

A stand or guard 34 illustrated in Figs. 6 and 7 is provided to preclude puncturing of the sheet or skin 18 by the sharp merchandise articles contained within the pocket. The stand 34 is disposed at the bottom of the pocket and may be nothing more than a bent cardboard.

In Fig. 5, I have illustrated the top view of a package such as shown in Fig. 4 in which the opening is visible to the viewer. It will be understood that the integral position of panel 10 which lies between the said legs of the slit 14 will remain in a plane common to the main portion of carrier panel 10.

In Fig. 8, I have illustrated a side elevational of a typical cylindrical merchandise container mounted and sealed by the stretched and other portions of the plastic sheet 18, whose lateral edge portions are suitably sealed and secured to the outer portions of the carrier panel 10 at the areas indicated by reference numerals 22.

By applying the plastic skin and forming a pocket or compartment using a rigid pattern or form, I avoid causing all sticking of the plastic sheet to the merchandise article or its package and avoid any reaction chemical with the merchandise article or its container, as is the case where fragile and light colored articles are to be packaged.

By using rigid patterns the plastic sheet in the area of the depressible or compressible part of the merchandise is made the ample and right size and is not collapsed during the formation of said plastic pocket.

As many changes could be made in the above construction, and as many apparently widely different embodiments of my invention within the scope of the claim could be constructed without departing from the spirit and scope thereof, it is intended that all matter contained in the accompanying specification shall be interpreted as illustrative and not in a limiting sense.

I claim:

A collapsible, openable, re-usable package for merchandise articles having a flexible carrier panel, said panel being partially divided by a substantially U-shaped slit into a main body portion and an integral inverted U-shaped end portion; a concave-like permanent plastic member having its outer areas secured to the outer surface of said body portion of said panel including the outer surface of said inverted U-shaped end portion and overlying said slit, said plastic member forming a permanent re-usable pocket with said panel said U-shaped end portion of said panel being bendable in one direction to provide an opening partially defined by said slit between said plastic member and said panel, said opening permitting insertion or removal of a merchandise article, said plastic member being adapted to normally hold a merchandise article against said panel.

References Cited in the file of this patent

UNITED STATES PATENTS

| | | |
|---|---|---|
| 2,481,302 | Fogel | Sept. 6, 1949 |
| 2,597,227 | Colliton | May 20, 1952 |
| 2,601,266 | Ducatman et al. | June 24, 1952 |
| 2,622,731 | Lovelady | Dec. 23, 1952 |
| 2,626,885 | Gollings | Jan. 27, 1953 |
| 2,796,985 | Gorton | June 25, 1957 |